(12) United States Patent
Anchala et al.

(10) Patent No.: US 12,388,544 B2
(45) Date of Patent: Aug. 12, 2025

(54) METHODS AND SYSTEMS FOR TUNING A WIRELESS NETWORK PROPAGATION MODEL

(71) Applicant: DISH Wireless L.L.C., Englewood, CO (US)

(72) Inventors: Aravind Anchala, Ralston, VA (US); Dilip Tandekar, Broadlands, VA (US); Gurpreet Sohi, Parker, CO (US); Sourabh Gupta, Ashburn, VA (US)

(73) Assignee: DISH Wireless L.L.C., Englewood, CO (US)

( * ) Notice: Subject to any disclaimer, the term of this patent is extended or adjusted under 35 U.S.C. 154(b) by 419 days.

(21) Appl. No.: 17/882,288

(22) Filed: Aug. 5, 2022

(65) Prior Publication Data

US 2024/0048256 A1 Feb. 8, 2024

(51) Int. Cl.
*H04B 17/391* (2015.01)
*H04B 17/26* (2015.01)
*H04W 16/18* (2009.01)
*H04B 17/11* (2015.01)
*H04B 17/21* (2015.01)

(52) U.S. Cl.
CPC ......... *H04B 17/3913* (2015.01); *H04B 17/26* (2015.01); *H04W 16/18* (2013.01); *H04B 17/11* (2015.01); *H04B 17/21* (2015.01)

(58) Field of Classification Search
CPC .... H04B 17/3913; H04B 17/26; H04B 17/11; H04B 17/21; H04W 16/18; H04W 16/22
USPC .................................................. 370/329–330
See application file for complete search history.

(56) References Cited

U.S. PATENT DOCUMENTS

| | | | |
|---|---|---|---|
| 2014/0156180 A1* | 6/2014 | Marti ................. | G01C 21/3896 701/423 |
| 2015/0341894 A1* | 11/2015 | Rowitch ............. | H04W 64/003 455/456.1 |
| 2018/0063738 A1* | 3/2018 | Beluri .................. | H04W 24/02 |
| 2019/0041488 A1* | 2/2019 | Ivanov ................. | H04W 64/00 |
| 2022/0376803 A1* | 11/2022 | Marshall ............. | H04B 17/391 |

* cited by examiner

*Primary Examiner* — Candal Elpenord
(74) *Attorney, Agent, or Firm* — Perkins Coie LLP

(57) ABSTRACT

The present disclosure is directed to methods and systems for tuning a wireless network propagation model. A propagation model system can generate a nominal propagation model of a coverage area using collected geographical data and network equipment information. The nominal propagation model can provide a representation of the wireless network and coverage areas. The propagation model system can continuously calibrate the generated propagation models with continuous wave data and crowdsourced data from user devices. The crowdsourced data can provide a real-time representation of the coverage capability in an area as the terrain and clutter in an area can change.

17 Claims, 6 Drawing Sheets

METHODS AND SYSTEMS FOR TUNING A WIRELESS NETWORK PROPAGATION MODEL

BACKGROUND

In some cases, users can purchase a mobile device based on the coverage area that a wireless carrier provides for a geographic region. For example, some carriers display a coverage map on their website to indicate to potential or existing customers the quality of service they can receive in rural or urban areas. However, the displayed coverage map on the website of a carrier is often outdated and inaccurate.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for tuning a wireless network propagation model. The propagation model system can collect geographical data about a coverage area(s) of a network provider from sources, such as geographic informational systems (GIS) data sources, satellite imagery, network provider databases, etc. The geographical data can include terrain, clutter (e.g., buildings, structures, trees, etc.), dimensions of the clutter, location of the clutter, and the location of transmitting/receiving antennas (e.g., base stations, equipment sites, etc.). The propagation model system can generate a nominal propagation model of a coverage area using the collected geographical data and network equipment information. The nominal propagation model can provide a representation of the wireless network and coverage areas. However, a nominal propagation model is a prediction of a coverage area and may not provide an accurate representation of the performance of a wireless network.

The propagation model system can tune/calibrate/update the nominal propagation model by collecting continuous wave data (e.g., drive test data) from mobile antennas traveling throughout the coverage area. For example, an antenna installed on a vehicle collects signal data as the vehicle travels throughout a coverage area. The collected data can provide an accurate and real-time indication of signal strength and quality of service at the measured location throughout the coverage area. The propagation model system can generate a propagation model for urban areas, suburban areas, or rural areas.

The propagation model system can continuously tune the generated propagation models with crowdsourced data from user devices. The crowdsourced data can provide a real-time representation of the coverage capability in an area as the terrain and clutter in an area can change. For example, as trees grow and buildings are constructed, the propagation model can become inaccurate as the network coverage can decline when obstacles, such as trees or buildings, interrupt communication from a network source. Collecting crowdsourced data from user devices, provides a dynamic way to continuously tune the propagation model to accurately represent the current coverage area.

Figure 1:
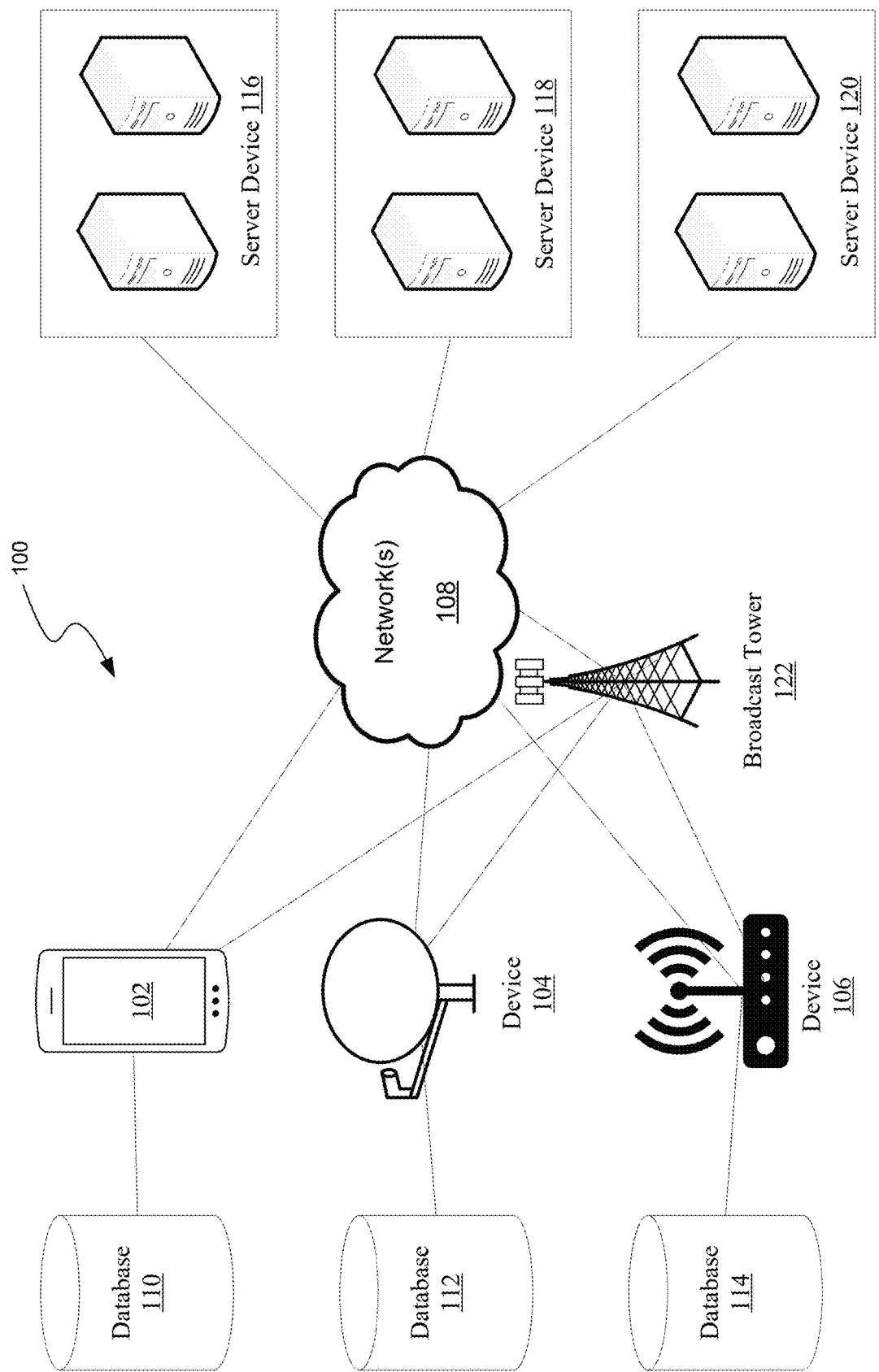
FIG. 1 illustrates an example of a distributed system for tuning a wireless network propagation model.

FIG. 1 illustrates an example of a distributed system for tuning a wireless network propagation model. Example system 100 presented is a combination of interdependent components that interact to form an integrated whole for tuning a wireless network propagation model. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to support collecting, sending, and receiving wireless network coverage data. In one example, a client device 102 may be a mobile phone, a client device 104 may be a smart OTA antenna, and a client device 106 may be a broadcast module box (e.g., set-top box). In other example aspects, client device 106 may be a gateway device (e.g., router) that is in communication with sources, such as ISPs, cable networks, or satellite networks. Other possible client devices include but are not limited to tablets, personal computers, televisions, etc. In some aspects, a client device, such as client devices 102, 104, and 106, may provide crowdsourced data or drive test data regarding the signal strength and quality of service at a location. In other aspects, client devices 102, 104, and 106, may be equipped to receive data from a source, such as broadcast tower 122, and measure the RF signal. The signals that client devices 102, 104, and 106 may receive may be transmitted from satellite broadcast tower 122. Broadcast tower 122 may also be configured to communicate with network(s) 108, in addition to being able to communicate directly with client devices 102, 104, and 106. In some examples, a client device may be a set-top box that is connected to a display device, such as a television (or a television that may have set-top box circuitry built into the television mainframe).

Client devices 102, 104, and 106 may be configured to run software that collects geographical data of a coverage area, generates a nominal propagation model of the coverage area, and calibrates the nominal propagation model with drive test data and crowdsources data. In some implementations, system 100 can import the crowdsourced data and drive test data on an area of interest (AOI) basis from a data lake. Client devices 102, 104, and 106 may access content data (e.g., a real-time or near real-time propagation model of the current network coverage in an area) through the networks. The content data may be stored locally on the client device or run remotely via network(s) 108. For example, a client device may receive a signal from broadcast tower 122 containing content data. The signal may indicate user requested content. The client device may receive this user requested content data and subsequently store this data locally in databases 110, 112, and/or 114. In alternative scenarios, the user requested content data may be transmitted from a client device (e.g., client device 102, 104, and/or 106) via network(s) 108 to be stored remotely on server(s) 116, 118, and/or 120. A user may subsequently access the content data from a local database (110, 112, and/or 114) and/or external database (116, 118, and/or 120), depending on where the content data may be stored. The system may be configured to receive and process user requested content data in the background.

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to check for the content data from a channel from an OTA antenna (e.g., antenna 104). A graphical user interface may display on the mobile device 102 the requested content data. Specifically, at a particular geolocation, the antenna 104 may receive signals from broadcast tower 122. The antenna 104 may then transmit those signals for analysis via network(s) 108. The results of the analysis may then be displayed on mobile device 102 via network(s) 108. In other examples, the results of the analysis may be displayed on a television device connected to a broadcast module box, such as broadcast module box 106.

In other examples, databases stored on remote servers 116, 118, and 120 may be utilized to assist the system in providing content to a user from a gateway with multiple networks. Such databases may contain certain content data such as video titles, actors in movies, video genres, etc. Such data may be transmitted via network(s) 108 to client devices 102, 104, and/or 106 to assist in identifying user requested media content. Because broadcast tower 122 and network(s) 108 are configured to communicate with one another, the systems and methods described herein may be able to identify requested content in different sources, such as streaming services, local and cloud storage, cable, satellite, or OTA.

Figure 2:
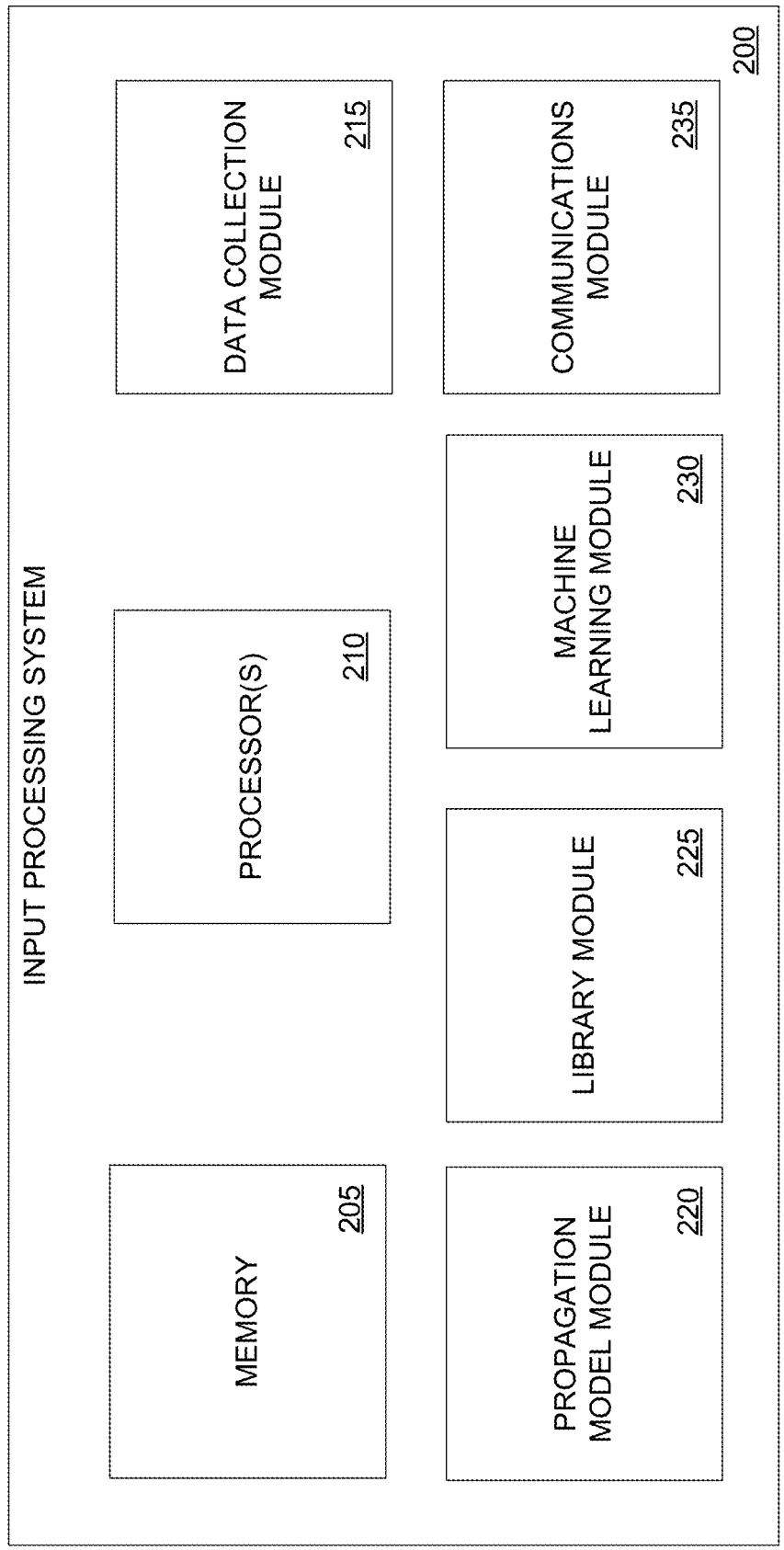
FIG. 2 illustrates an example input processing system for implementing systems and methods for tuning a wireless network propagation model.

FIG. 2 illustrates an example input processing system for implementing systems and methods for tuning a wireless network propagation model. The input processing system (e.g., one or more data processors) is capable of executing algorithms, software routines, and/or instructions based on processing data provided by a variety of sources related to tuning a wireless network propagation model with collected crowdsourced data and drive test data. The input processing system can be a general-purpose computer or a dedicated, special-purpose computer. According to the embodiments shown in FIG. 2, the disclosed system can include memory 205, one or more processors 210, data collection module 215, propagation model module 220, library module 225, machine learning module 230, and communications module 235. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of data collection module 215, propagation model module 220, library module 225, machine learning module 230, and communications module 235. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one database containing the nominal propagation model, the collected drive test data and crowdsourced data, and the calibrated propagation module.

Data collection module 215 may be configured to collect geographical data about a coverage area(s) of a network from sources, such as geographic informational systems (GIS) data sources, satellite imagery, network provider databases, etc. The geographical data can include terrain, clutter (e.g., buildings, structures, trees, etc.), dimensions of the clutter, location of the clutter, and the location of transmitting/receiving antennas (e.g., base stations, equipment sites, etc.). The data collection module 215 can collect drive test data from mobile antennas to procure signal measurements at various locations in a network. Additionally, the data collection module 215 can collect crowdsourced data from user devices connected to the network to procure signal measurements at various locations in a network.

Propagation model module 220 may be configured to generate and calibrate a propagation model for a coverage area. The propagation model module 220 can generate and calibrate different propagation models for different types of coverage areas, such as urban areas, suburban areas, and rural areas. For example, the characteristics of a rural model are different than the characteristics of an urban model. In a dense urban environment, the strength of a signal can decline faster at a shorter distance from a base station than a signal in a rural area. With the geographic data and information regarding the installed network equipment, the propagation model module 220 can determine/predict what the signal strength measurements are at any locations within the coverage area. After drive test data and/or crowdsourced data is collected, the propagation model module 220 can use the signal measurements in the collected data to determine whether to update the predictions in the propagation model to accurately reflect the performance of the wireless network. In some implementations, the propagation model module 220 can import the crowdsourced data and drive test data on an AOI basis from a data lake.

Library module 225 may be configured to store the propagation models created by the propagation model module 220 in a library. In some embodiments, the library module 225 can select a model for a coverage area that gives the best standard deviation or mean error from what is determined in the field and what is predicted in the nominal propagation model. For example, as a city develops and more buildings are constructed, the network coverage changes which results in the created models becoming inaccurate. After drive test data or crowdsourced data is collected, the library module 225 can select a different model from the library that more accurately represents the coverage provided by the network.

Machine learning module 230 may be configured to tune/calibrate propagation models with collected drive test data and crowdsourced data. The machine learning module 215 may be configured to tune a propagation model based on at least one machine-learning algorithm trained on at least one dataset reflecting a tuned propagation model with collected data. The at least one machine-learning algorithms (and models) may be stored locally at databases and/or externally at databases (e.g., cloud databases and/or cloud servers). Client devices may be equipped to access these machine learning algorithms and intelligently identify collected network data and update a propagation model with the collected data based on at least one machine-learning model that is trained on a user updated propagation model. For example, as new equipment or buildings are added to a network coverage area, drive test data and crowdsourced data may be collected to train a machine-learning model to automatically identify changes to the network coverage area and update the propagation model to reflect the changes.

As described herein, a machine-learning (ML) model may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process collected network data and other data stores to identify changes in a network and update the propagation model based on the changes. The ML model(s) may be trained and subsequently deployed to automatically identify changes in a network and update the propagation model based on the changes. The trained ML model may be deployed to one or more devices. As a specific example, an instance of a trained ML model may be deployed to a server device and to a client device. The ML model deployed to a server device may be configured to be used by the client device when, for example, the client device is connected to the internet. Conversely, the ML model deployed to a client device may be configured to be used by the client device when, for example, the client device is not connected to the internet. In some instances, a client device may not be connected to the internet but still configured to receive satellite signals with multimedia information and channel guides. In such examples, the ML model may be locally cached by the client device.

Communications module 235 is associated with sending/receiving information (e.g., collected network data from data collection module 215, propagation model module 220, library module 225, and machine learning module 230) with a remote server or with one or more client devices, streaming devices, routers, OTA boxes, set-top boxes, etc. These communications can employ any suitable type of technology, such as Bluetooth, WiFi, WiMax, cellular, single hop communication, multi-hop communication, Dedicated Short Range Communications (DSRC), or a proprietary communication protocol. Furthermore, communications module 235 may be configured to communicate content data to a client device and/or OTA box, router, smart OTA antenna, and/or smart TV, etc.

Figure 3:
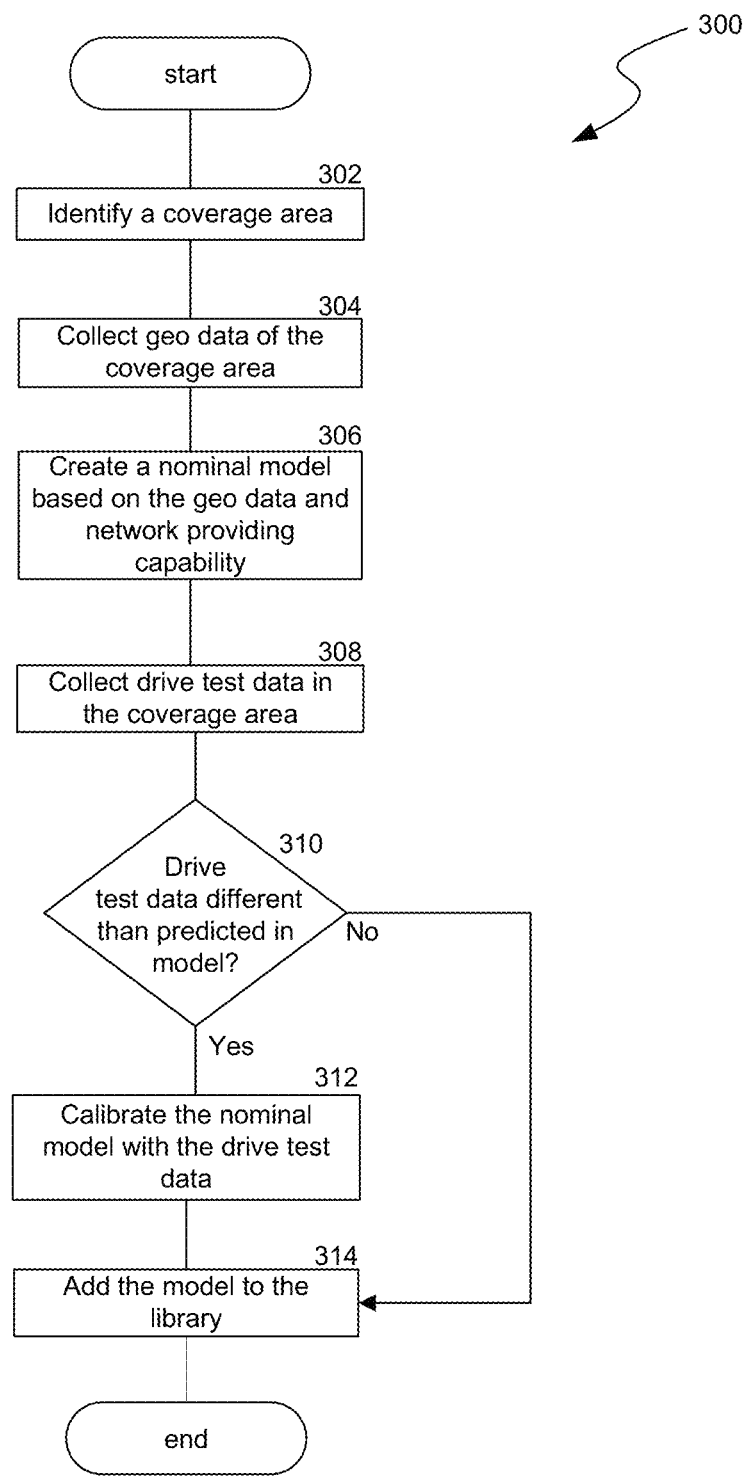
FIG. 3 is a flow diagram illustrating a process used in some implementations for generating a wireless network propagation model.

FIG. 3 is a flow diagram illustrating a process 300 used in some implementations for generating a wireless network propagation model. In some implementations, process 300 is triggered by a user requesting information about a coverage area, a user accessing an application on a user-interface, new equipment being added to the wireless system, new buildings being added within the wireless system, whenever a time threshold passes, or whenever a threshold of customers are added to the wireless system. In various implementations, process 300 is performed locally on the user device or performed by cloud-based device(s) that can provide/support generating a wireless network propagation model.

At block 302, process 300 identifies a coverage area(s) within a wireless network. A user can select the coverage area via a user-interface. The user can select a predetermined coverage area or create a customized coverage area in the user interface. In some cases, the coverage area is the area supported by a single base station or multiple base stations. The coverage area can include rural, urban, or suburban environments. The coverage area can change as equipment is installed in the wireless network. In some implementations, a user can inquire about the quality of service for the coverage area. For example, a user inquires if the network capability at a location can support a service (e.g., hotspot, video streaming, etc.).

At block 304, process 300 collects geographical data about the coverage area(s). Process 300 can collect the geographical data from sources, such as geographic informational systems (GIS) data sources, satellite imagery, geo-databases, etc. The geographical data can include terrain (e.g., trees, vegetation, hills, mountains, valleys, lakes, etc.), clutter (e.g., buildings, structures, equipment, etc.), morphology (dense urban, residential, commercial, village, forest, etc.), dimensions of the clutter (building height, building width, etc.), location of the clutter, environmental characteristics, and the location of transmitting/receiving antennas (e.g., base stations, equipment sites, etc.).

At block 306, process 300 creates a nominal propagation model of the coverage area based on the geographical data and the continuous wave data procured during model tuning. The vintage (time period) of the geographical data and the continuous wave data will determine the accuracy of the nominal propagation model. In some areas, if either of this data is not readily available, data collected in other markets with similar profiles is also used. The nominal propagation model can provide a simulation/prediction of the signal strength, interference or quality of service that the wireless network can provide to user devices within the coverage area. For example, the nominal propagation model provides the predicted signal strength measurements that devices can expect at locations within the coverage area. The propagation model can indicate how many devices and type of service that can be supported at any location within the coverage area. For example, the propagation model can indicate the signal strength (e.g., −70 dBm) or if a device can hotspot or stream videos. The accuracy of the nominal propagation model can depend on the input data (e.g., when the geographic data collected, when and how many measurements samples of continuous wave data were captured, and if the measurements were enough to have an accurate representation of that coverage zone).

At block 308, process 300 collects drive test continuous wave (e.g., continuous wave) data of the network performance within the coverage area. For example, an antenna mounted on a vehicle (e.g., drone, car, truck, etc.) can collect RF signal measurements (e.g., signal strength, signal to noise ratio, modulation quality, phase noise, power in a band, output power, etc.) from various locations throughout a coverage area. The drive test data can include the geolocation of each measurement that was captured within the coverage area, signal strength/power measurements at each point with the associated latitude/longitude information. For example, each data point has attributes to identify the location and captured measurement. In some implementations, process 300 can import the drive test data on an AOI basis from a data lake (e.g., storage repository for drive test data).

For each location, at block 310, process 300 can compare the signal measurements from the drive test data with the signal measurements predicted in the nominal propagation model to identify which parameters need to be adjusted. When the predicted signal measurements of the propagation model at locations are within of a predetermined range (threshold) of the drive test measurements at those same locations, at block 314, process 300 stores the propagation model in a library.

When the predicted signal measurements of the propagation model at locations are outside of a predetermined range (threshold) of the drive test measurements at those locations, at block 312, process 300 calibrates/tunes the nominal propagation model with the collected drive test data to more accurately simulate the network coverage provided to the coverage area. For example, the environment characteristics of the coverage area change as buildings are constructed, vegetation grows or is removed, or wireless equipment is installed. The drive test data can indicate how the wireless network has changed and which parameters (e.g., predicted signal strength at a location) from the prediction in the nominal propagation model have changed. For example, at a location the drive test data indicates that the quality of service has increased or decreased as the environment has changed. The calibrated propagation model can provide an accurate representation of the current coverage capability of the wireless network. With the calibrated propagation model, users can identify locations to install equipment to improve the quality of service for customers. The calibrated propagation model can indicate the type of service that can be supported at any location within the coverage area. For example, the propagation model can indicate the signal strength (e.g., −70 dBm) a user can expect at a particular location and whether the service is sufficient to hotspot or stream videos. The calibration process can update the model for clutter loss (e.g., building loss for the buildings obstructing the transmitter and receiver, foliage loss, etc.) for different cluster classes to improve the standard deviation and the mean error of the model for accurate coverage predictions.

At block 314, process 300 adds the calibrated nominal propagation model to a propagation library. The library can include propagation models for dense urban areas (e.g., downtown of a city), urban areas, suburban areas, and rural areas. The characteristics of each model indicate the quality of service provided for each area. For example, in a dense urban area with many buildings, more base stations are required to maintain a quality of service compared to a rural environment. In some implementations, based on the identified changes to a wireless system, instead of updating the model, process 300 selects a model from the library for a coverage area that gives the best standard deviation or mean error from what is measured by the drive test data and what is predicted in the propagation model.

Figure 4:
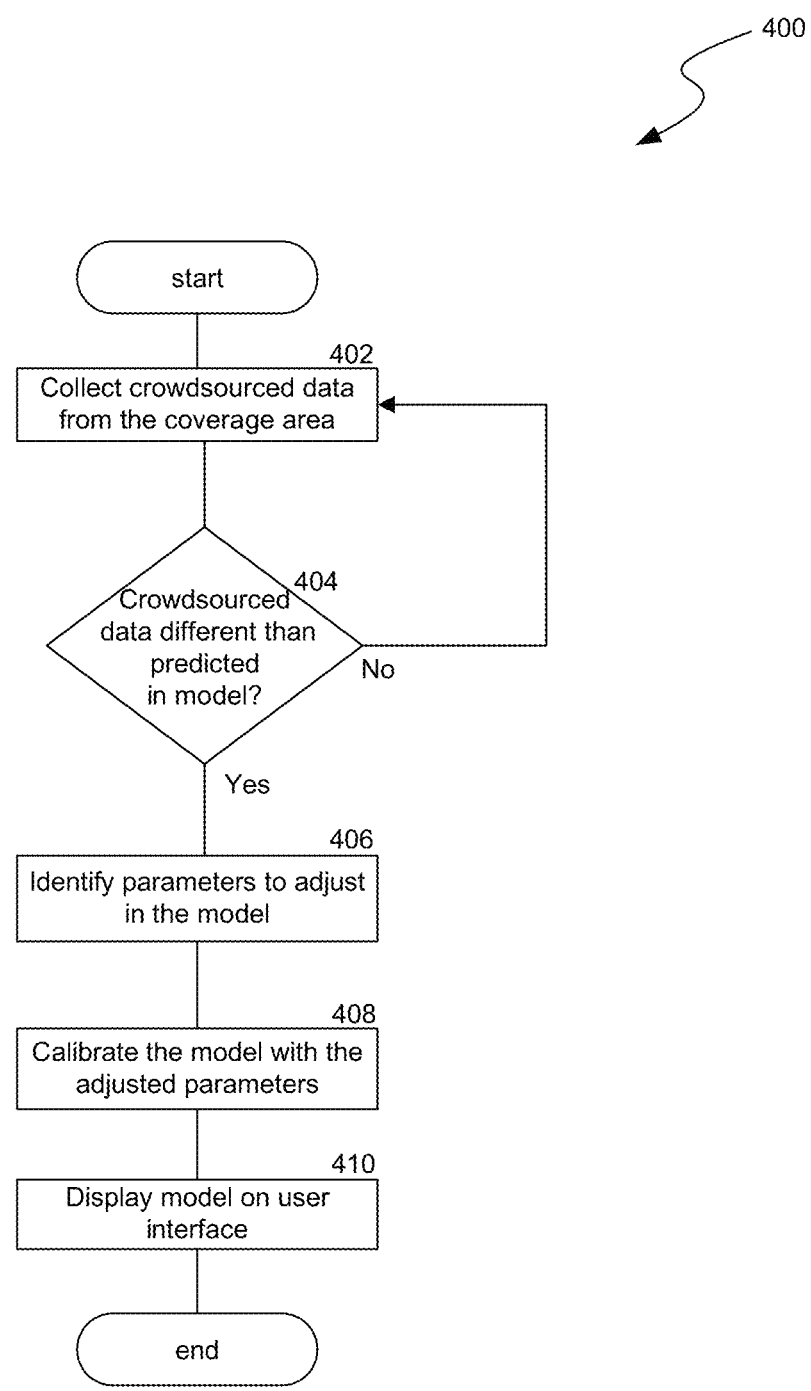
FIG. 4 is a flow diagram illustrating a process used in some implementations for tuning a wireless network propagation model.

FIG. 4 is a flow diagram illustrating a process 400 used in some implementations for tuning a wireless network propagation model. In some implementations, process 400 is triggered by a user requesting information about a coverage area, a user accessing an application on a user-interface, new equipment being added to the wireless system, new buildings being added within the wireless system, environmental characteristics changing within the wireless system, whenever a time threshold passes, or whenever a threshold of customers are added to the wireless system. In various implementations, process 400 is performed locally on the user device or performed by cloud-based device(s) that can provide/support tuning a wireless network propagation model.

At block 402, process 400 collects crowdsourced data from user devices connected to the wireless network. Process 400 can collect the crowdsourced data continuously, periodically, or whenever a threshold of customers connects to the network. The crowdsourced data can include signal measurements (e.g., signal strength, signal to noise ratio, modulation quality, phase noise, power in a band, output power, etc.) and the geolocation at which the signal measurements were captured. In some implementations, process 400 can import the crowdsourced data on an AOI basis from a data lake. The crowd source data can have different sets of attributes collected on the user devices to measure the end user experience. In some implementations, for model tuning, signal strength measurements are used to change the clutter loss for different cluster classes (e.g., building loss for the buildings obstructing the transmitter and receiver, foliage loss, etc.). Since performing drive testing to collect measured data periodically is not always practical (e.g., time consuming, fuel inefficient, etc.), crowd source data (collected in real time) is a more effective method to continuously tune the attributes of the models. Tuning with crowdsource data can ensure the propagation models adapt to the change in the environment (e.g., new construction, seasonal changes, etc.) to accurately represent the wireless coverage and QoS offered to the end users in a specific area.

For each location, at block 404, process 400 can compare the signal measurements from the crowdsourced data with the signal measurements predicted in the propagation model. At block 406, based on the comparison, process 400 can identify which parameters (e.g., environmental characteristics or signal measurements) to adjust in the model to accurately represent the network coverage provided to the coverage area. When the predicted signal measurements of the propagation model at locations are within of a predetermined range (threshold) of the crowdsourced data measurements at those same locations, process 300 can continue to collect crowdsourced data for user devices.

When the predicted signal measurements of the propagation model at locations are outside of a predetermined range (threshold) of the crowdsourced data measurements at those locations, at block 408, process 400 calibrates/tunes the nominal propagation model with the collected crowdsourced data to more accurately simulate the network coverage provided to the coverage area. For example, the environment characteristics of the coverage area change as buildings are constructed, vegetation grows or is removed, or wireless equipment is installed. The crowdsourced data can indicate how the wireless network has changed and which parameters (e.g., predicted signal strength at a location) from the prediction in the propagation model have changed. For example, at a location the crowdsourced data indicates that the quality of service has increased or decreased as the environment has changed. The calibrated propagation model can provide an accurate representation of the current coverage capability of the wireless network. With the calibrated propagation model, users can identify locations to install equipment to improve the quality of service for customers.

At block 408, process 400 updates the propagation model with the adjusted parameters from the crowdsourced data. The updated propagation model can incorporate changes to the wireless network in a dynamic way to accurately reflect the performance capability of the wireless network. The updated propagation model can indicate the type of service that can be supported at any location within the coverage area. For example, the propagation model can indicate the signal strength (e.g., −70 dBm) a user can expect at a particular location and whether the service is sufficient to hotspot or stream videos.

Process 400 can store the updated propagation model in the propagation library. In some implementations, based on the identified changes to a wireless system, instead of updating the model, process 400 selects a model from the library for a coverage area that gives the best standard deviation or mean error from what is measured by the crowdsourced data and what is predicted in the propagation model. At block 410, process 400 can display the propagation model on a user interface. Process 400 can respond to coverage inquiries from the user interface. For example, using the propagation model, process 400 provides a user via the user interface a prediction of the quality of service (e.g., signal strength measurement, whether the user can hotspot or stream/download videos, etc.) the wireless network can provide for a requested location or area.

Figure 5:
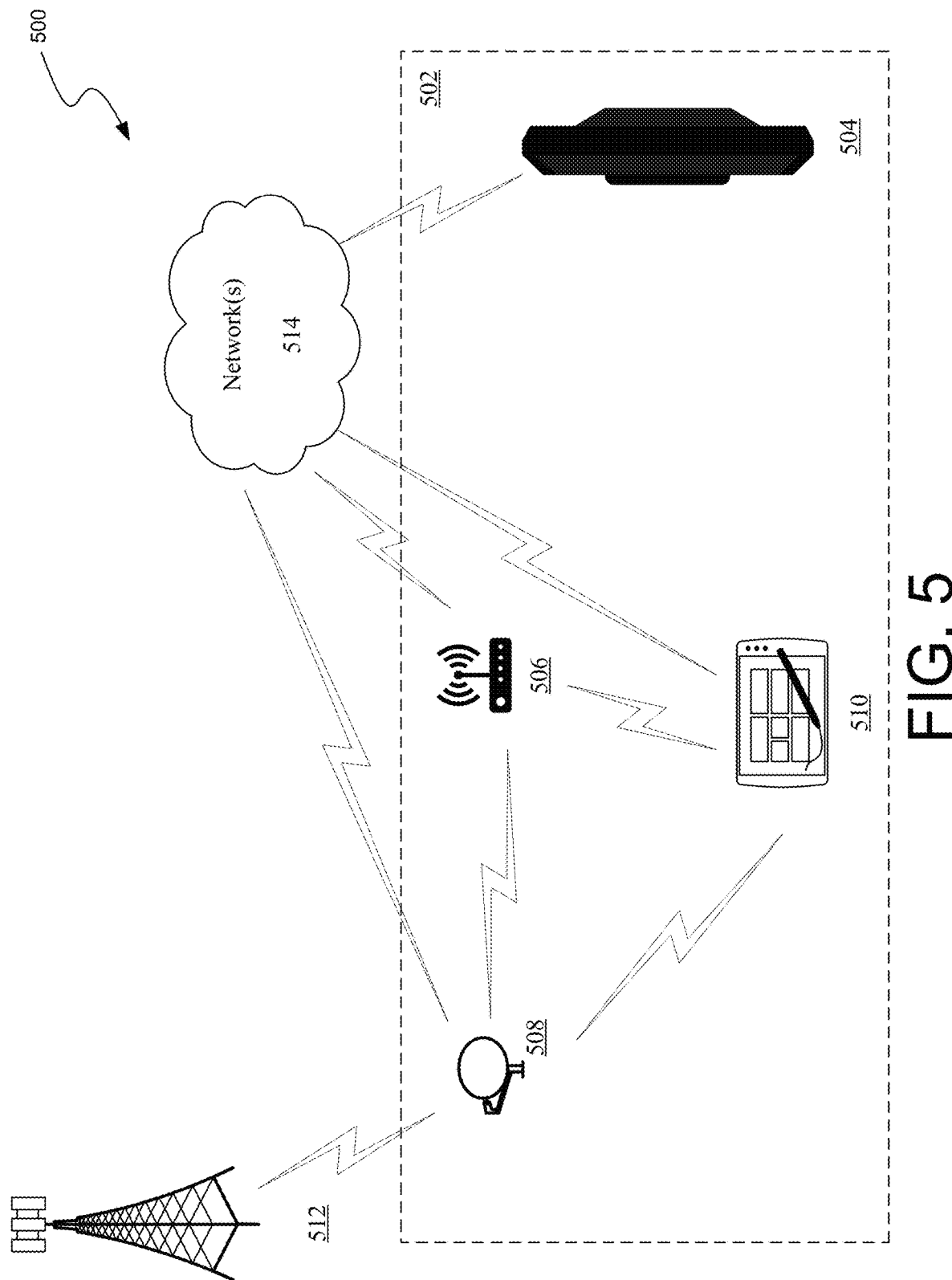
FIG. 5 illustrates an example environment of operation of the disclosed technology.

FIG. 5 illustrates an example environment of operation of the disclosed technology. In the example environment illustrated in FIG. 5, area 502 may represent a house, a commercial building, an apartment, a condo, or any other type of suitable dwelling. Inside area 502 is at least one television 504, an OTA box 506 (e.g., router or broadcast module box) an OTA antenna 508, and a mobile device 510. Each of these devices may be configured to communicate with network(s) 514. OTA box 506 may be configured as a central gateway communicable with various multimedia content providers, networks, devices, and user storage sources, among other servers and databases housing content available for retrieval and display on user devices. Network(s) 514 may be a WiFi network and/or a cellular network. The OTA antenna 508 may also be configured to receive local broadcast signals from local broadcast tower 512 or satellite broadcast tower.

Figure 6:
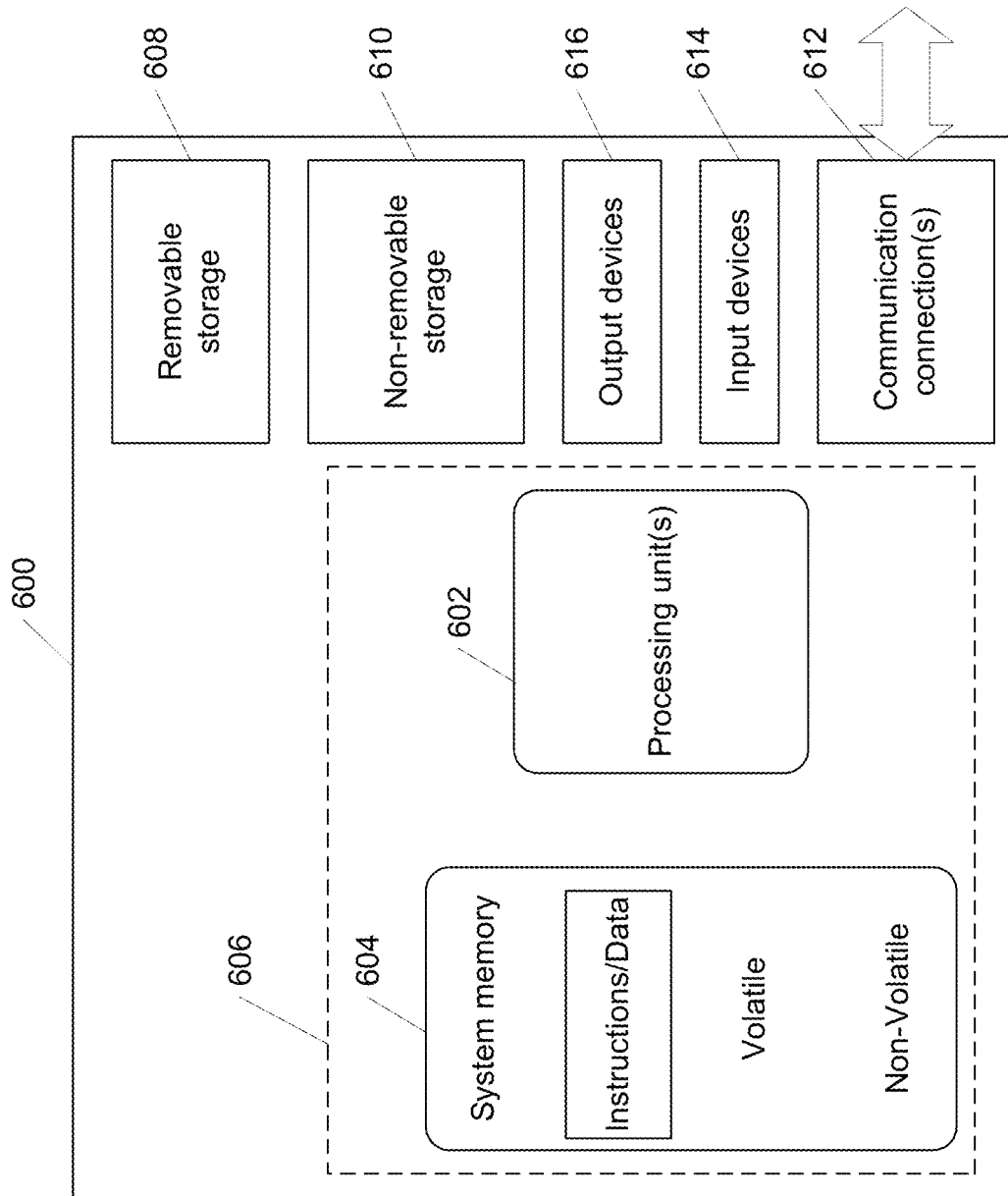
FIG. 6 illustrates one example of a suitable operating environment in which one or more of the present embodiments may be implemented.

FIG. 6 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, information related to detected devices, compression artifacts, association information, personal gateway settings, and instruction to perform the methods disclosed herein) may be volatile (such as RAM), non-volatile (such as ROM, flash memory, etc.), or some combination of the two. This most basic configuration is illustrated in FIG. 6 by dashed line 606. Further, environment 600 may also include storage devices (removable 608 and/or non-removable 610) including, but not limited to, magnetic or optical disks or tape. Similarly, environment 600 may also have input device(s) 614 such as keyboard, mouse, pen, voice input, etc., and/or output device(s) 616 such as a display, speakers, printer, etc. Also included in the environment may be one or more communication connections, 612, such as Bluetooth, WiFi, WiMax, LAN, WAN, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 600 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims. Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A method for tuning a wireless network propagation model, the method comprising:
   collecting geographical data associated with a wireless network coverage area;
   generating the wireless network propagation model based on the geographical data and at least one wireless network equipment providing service to the wireless network coverage area;
   collecting continuous wave data at two or more locations within the wireless network coverage area, wherein the continuous wave data includes a first set of wireless signal measurements at the two or more locations;

performing a comparison of the first set of wireless signal measurements to predicted measurements from the wireless network propagation model; and in response to the comparison not being within a threshold, calibrating the wireless network propagation model based on the first set of wireless signal measurements at the two or more locations.

2. The method of claim 1, further comprising:

collecting, from at least one user device, crowdsourced data at the two or more locations within the wireless network coverage area,
wherein the crowdsourced data includes a second set of wireless signal measurements at the two or more locations;

performing a measurement comparison of the second set of wireless signal measurements to predicted measurements from the wireless network propagation model; and in response to the measurement comparison not being within a measurement threshold, calibrating the wireless network propagation model based on the second set of wireless signal measurements.

3. The method of claim 1, further comprising:

identifying at least one parameter in the wireless network propagation model to adjust based on the comparison of the first set of wireless signal measurements to predicted measurements from the wireless network propagation model.

4. The method of claim 1, further comprising:

storing the wireless network propagation model in a library.

5. The method of claim 1, further comprising:

receiving an inquiry regarding network quality at a location within the wireless network coverage area; and determining a result to the inquiry from the wireless network propagation model.

6. The method of claim 1, wherein the wireless network propagation model is calibrated by at least one machine-learning algorithm, wherein the at least one machine-learning algorithm is trained based on at least one dataset associated with a past wireless network propagation model.

7. A computing system comprising:

one or more processors; and one or more memories storing instructions that, when executed by the one or more processors, cause the system to perform a process for tuning a wireless network propagation model, the process comprising:

collecting geographical data associated with a wireless network coverage area;

generating the wireless network propagation model based on the geographical data and at least one wireless network equipment providing service to the wireless network coverage area;

collecting continuous wave data at two or more locations within the wireless network coverage area,
wherein the continuous wave data includes a first set of wireless signal measurements at the two or more locations;

performing a comparison of the first set of wireless signal measurements to predicted measurements from the wireless network propagation model; and in response to the comparison not being within a threshold, calibrating the wireless network propagation model based on the first set of wireless signal measurements at the two or more locations.

8. The computing system of claim 7, wherein the process further comprises:

collecting, from at least one user device, crowdsourced data at the two or more locations within the wireless network coverage area,
wherein the crowdsourced data includes a second set of wireless signal measurements at the two or more locations;

performing a measurement comparison of the second set of wireless signal measurements to predicted measurements from the wireless network propagation model; and in response to the measurement comparison not being within a measurement threshold, calibrating the wireless network propagation model based on the second set of wireless signal measurements.

9. The computing system of claim 7, wherein the process further comprises:

identifying at least one parameter in the wireless network propagation model to adjust based on the comparison of the first set of wireless signal measurements to predicted measurements from the wireless network propagation model.

10. The computing system of claim 7, wherein the process further comprises:

storing the wireless network propagation model in a library.

11. The computing system of claim 7, wherein the process further comprises:

receiving an inquiry regarding network quality at a location within the wireless network coverage area; and determining a result to the inquiry from the wireless network propagation model.

12. The computing system of claim 7, wherein the wireless network propagation model is calibrated by at least one machine-learning algorithm, wherein the at least one machine-learning algorithm is trained based on at least one dataset associated with a past wireless network propagation model.

13. A non-transitory computer-readable medium storing instructions that, when executed by a computing system, cause the computing system to perform operations for tuning a wireless network propagation model, the operations comprising:

collecting geographical data associated with a wireless network coverage area;

generating the wireless network propagation model based on the geographical data and at least one wireless network equipment providing service to the wireless network coverage area;

collecting continuous wave data at two or more locations within the wireless network coverage area,
wherein the continuous wave data includes a first set of wireless signal measurements at the two or more locations;

performing a comparison of the first set of wireless signal measurements to predicted measurements from the wireless network propagation model; and in response to the comparison not being within a threshold, calibrating the wireless network propagation model based on the first set of wireless signal measurements at the two or more locations.

14. The non-transitory computer-readable medium of claim 13, wherein the operations further comprise:

collecting, from at least one user device, crowdsourced data at the two or more locations within the wireless network coverage area,
wherein the crowdsourced data includes a second set of wireless signal measurements at the two or more locations;
performing a measurement comparison of the second set of wireless signal measurements to predicted measurements from the wireless network propagation model; and
in response to the measurement comparison not being within a measurement threshold, calibrating the wireless network propagation model based on the second set of wireless signal measurements.

15. The non-transitory computer-readable medium of claim 13, wherein the operations further comprise:
identifying at least one parameter in the wireless network propagation model to adjust based on the comparison of the first set of wireless signal measurements to predicted measurements from the wireless network propagation model; and
storing the wireless network propagation model in a library.

16. The non-transitory computer-readable medium of claim 13, wherein the operations further comprise:
receiving an inquiry regarding network quality at a location within the wireless network coverage area; and
determining a result to the inquiry from the wireless network propagation model.

17. The non-transitory computer-readable medium of claim 13, wherein the wireless network propagation model is calibrated by at least one machine-learning algorithm, wherein the at least one machine-learning algorithm is trained based on at least one dataset associated with a past wireless network propagation model.

* * * * *